United States Patent
Cronin et al.

(10) Patent No.: US 12,164,609 B2
(45) Date of Patent: Dec. 10, 2024

(54) METHOD AND APPARATUS FOR PROVIDING VERIFICATION

(71) Applicant: Nokia Technologies Oy, Espoo (FI)

(72) Inventors: Harry Cronin, Cambridge (GB); William Schnabel, Surrey (GB); Christopher Wright, London (GB); Phil Catton, Cambridge (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 283 days.

(21) Appl. No.: 17/724,129

(22) Filed: Apr. 19, 2022

(65) Prior Publication Data

US 2022/0350867 A1    Nov. 3, 2022

(30) Foreign Application Priority Data

Apr. 28, 2021    (EP) .................................... 21170811

(51) Int. Cl.
*G06F 21/31* (2013.01)
*G06V 20/40* (2022.01)
*G10L 25/57* (2013.01)

(52) U.S. Cl.
CPC .............. *G06F 21/31* (2013.01); *G06V 20/40* (2022.01); *G10L 25/57* (2013.01); *G06F 2221/2133* (2013.01)

(58) Field of Classification Search
CPC ........ G06F 21/31; G06F 21/316; G06F 21/32; G06F 2221/2133; G06V 20/40; G10L 25/57
See application file for complete search history.

(56) References Cited

U.S. PATENT DOCUMENTS

| | | | |
|---|---|---|---|
| 5,761,329 A | 6/1998 | Chen et al. | |
| 10,579,783 B1* | 3/2020 | Aument | G06V 40/40 |
| 2006/0280339 A1 | 12/2006 | Cho | |
| 2016/0050197 A1* | 2/2016 | Panging | G06F 21/32 |
| | | | 726/6 |
| 2019/0065875 A1 | 2/2019 | Sheikh Faridul et al. | |
| 2022/0269922 A1* | 8/2022 | Mathews | G06V 20/46 |

FOREIGN PATENT DOCUMENTS

CN    110164013 A    8/2019

OTHER PUBLICATIONS

Notice of Allowance received for corresponding European Patent Application No. 21170811.0, dated Jan. 18, 2024, 8 pages.

(Continued)

*Primary Examiner* — Malcolm Cribbs
(74) *Attorney, Agent, or Firm* — SQUIRE PATTON BOGGS (US) LLP

(57) ABSTRACT

An apparatus, method and computer program is disclosed. The apparatus may comprise means for receiving video data representing a video recording of at least one input made by a user at a user device; receiving audio data representing an audio recording of at least one audio input made by the user at the user device; determining whether there is a correspondence between the at least one input represented in the video data and the at least one audio input represented in the audio data; and providing verification based on the determination.

19 Claims, 5 Drawing Sheets

(56) References Cited

OTHER PUBLICATIONS

Shumailov et al., "Hearing your touch: A new acoustic side channel on smartphones", arXiv, Mar. 26, 2019, pp. 1-23.

Xiao et al., "Mobile Phones Know Your Keystrokes through the Sounds from Finger's Tapping on the Screen", IEEE 40th International Conference on Distributed Computing Systems (ICDCS), Nov. 29-Dec. 1, 2020, pp. 1-11.

Zarandy et al., "Hey Alexa what did I just type? Decoding smartphone sounds with a voice assistant", arXiv, Dec. 1, 2020, pp. 1-18.

Kim et al., "TapSnoop: Leveraging Tap Sounds to Infer Tapstrokes on Touchscreen Devices", IEEE Access, vol. 8, Jan. 13, 2020, pp. 14737-14748.

"The advantages of video banking",JRNI, Retrieved on Apr. 4, 2022, Webpage available at : https://www.jrni.com/blog/advantages-of-video-banking.

"POPio Mobile Video Cloud adds transaction-based banking with remote deposit",ATM Marketplace, Retrieved on Apr. 4, 2022, Webpage available at : https://www.atmmarketplace.com/news/popio-mobile-video-cloud-adds-transaction-based-banking-with-remote-deposit/.

"Video Identification Explained",Fully-Verified, Retrieved on Apr. 4, 2022, Webpage available at : https://fully-verified.com/video-identification-explained/.

"Supervised Remote Identity Proofing™",NextgenID, Retrieved on Apr. 4, 2022, Webpage available at : https://www.nextgenid.com/products_kiosk.php.

"Scammer used deepfake video to impersonate U.S. Admiral on Skype chat and swindle nearly $300,000 out of a California widow",Daily Mail Online, Retrieved on Apr. 4, 2022, Webpage available at : https://www.dailymail.co.uk/news/article-8875299/Scammer-uses-deepfake-video-swindle-nearly-300-000-California-widow.html.

"Fraudsters Used AI to Mimic CEO's Voice in Unusual Cybercrime Case",The Wall Street Journal, Retrieved on Apr. 4, 2022, Webpage available at : https://www.wsj.com/articles/fraudsters-use-ai-to-mimic-ceos-voice-in-unusual-cybercrime-case-11567157402.

"About That Pelosi Video: What to Do About 'Cheapfakes' in 2020",.Lawfare, Retrieved on Apr. 4, 2022, Webpage available at : https://www.lawfareblog.com/about-pelosi-video-what-do-about-cheapfakes-2020?bcmt=1.

"Better decisions from trusted images",.Truepic, Retrieved on Apr. 4, 2022, Webpage available at : https://truepic.com/truepic-vision/.

Agarwal et al., "Detecting Deep-Fake Videos from Phoneme-Viseme Mismatches", IEEE/CVF Conference on Computer Vision and Pattern Recognition Workshops (CVPRW), Jun. 14-19, 2020, 9 pages.

"Authenticity Verification of User Generated Video Files", Prover, White Paper, 2021, 34 pages.

Sim et al., "Identity Recognition Based on Bioacoustics of Human Body", IEEE Transactions on Cybernetics, vol. 51, No. 5, May 2021, pp. 2761-2772.

Li et al., "Velody: Nonlinear Vibration Challenge-Response for Resilient User Authentication", Proceedings of the 2019 ACM SIGSAC Conference on Computer and Communications Security, Nov. 2019, pp. 1201-1213.

Roth et al., "Biometric authentication via keystroke sound", International Conference on Biometrics (ICB), Jun. 4-7, 2013, 8 pages.

"Typing Behavior based Continuous User Authentication",Computer Vision Lab, Retrieved on Apr. 4, 2022, Webpage available at : http://cvlab.cse.msu.edu/project-typing-behavior.html.

Pleva et al., Improving static audio keystroke analysis by score fusion of acoustic and timing data, Multimedia Tools and Applications, vol. 76, 2017, pp. 25749-25766.

Extended European Search Report received for corresponding European Patent Application No. 21170811.0, dated Oct. 22, 2021, 9 pages.

Raguram et al., "On the Privacy Risks of Virtual Keyboards: Automatic Reconstruction of Typed Input from Compromising Reflections", IEEE Transactions on Dependable and Secure Computing, vol. 10, No. 3, May-Jun. 2013, pp. 154-167.

Chugh et al., "Not made for each other—Audio-Visual Dissonance-based Deepfake Detection and Localization", arXiv, Mar. 20, 2021, 9 pages.

\* cited by examiner

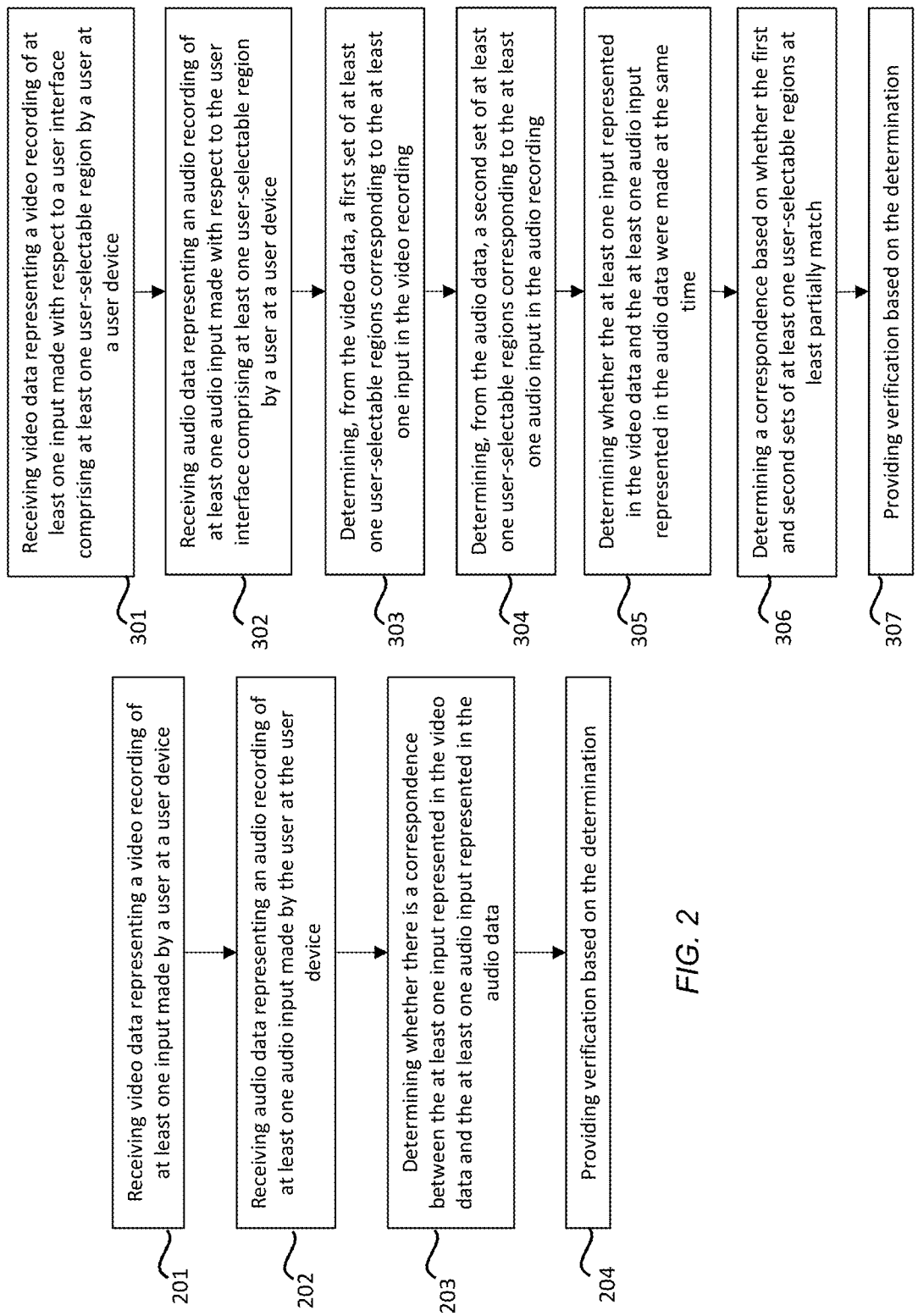

METHOD AND APPARATUS FOR PROVIDING VERIFICATION

RELATED APPLICATION

This application claims priority to the European patent application number 21170811.0, filed on Apr. 28, 2021, the content of which is incorporated herein by reference in its entirety.

FIELD

Example embodiments relate to an apparatus, method and computer program for providing verification, for example using video data and audio data.

BACKGROUND

Remotely accessible services, for example banking services, may require verification of a user before access to the service is provided. Such verification may be involve the user using a remote user device to capture video data. For example, video verification may be used to verify the identity of a user using facial feature analysis. Such methods may be used to authenticate transactions and provide access to private data. Software which fakes such video data, for example by producing 'deepfake' videos, may accurately imitate the features required for successful verification and in turn provide unwanted verification of transactions and breach the security of remotely accessible services.

SUMMARY

The scope of protection sought for various embodiments is set out by the independent claims. The embodiments and features, if any, described in this specification that do not fall under the scope of the independent claims are to be interpreted as examples useful for understanding various embodiments.

According to a first aspect, this specification describes an apparatus comprising means for:
  receiving video data representing a video recording of at least one input made by a user at a user device; receiving audio data representing an audio recording of at least one audio input made by the user at the user device; determining whether there is a correspondence between the at least one input represented in the video data and the at least one audio input represented in the audio data; and providing verification based on the determination.

The determining means may be configured to determine whether the at least one input represented in the video data and the at least one audio input represented in the audio data were made at a same time based on timing data in the received video data and audio data.

The apparatus may further comprise means for: determining, from the video data, a first set of at least one user-selectable regions of a user interface corresponding to the at least one input in the video recording; and determining, from the audio data, a second set of the at least one user-selectable regions corresponding to the at least one audio input in the audio recording; and the means for determining a correspondence may be configured to determine whether there is a correspondence between the at least one input represented in the video data and the at least one audio input represented in the audio data based at least in part on whether the first set of at least one user-selectable regions and second set of at least one user-selectable regions at least partially match.

At least one of the at least one user-selectable regions of the user interface may be configured to have a respective optical modification, and the means for determining the first set of at least one user-selectable regions may be configured to determine the first set of at least one user-selectable regions based at least in part on a detection of the optical modification represented in the video data.

Each respective optical modification may comprise at least one of colour modification or a brightness modification.

The means for determining the second set of the at least one user-selectable regions may be configured to determine the second set of the at least one user-selectable regions based at least in part on spatial information in the audio data.

Each of the at least one user-selectable regions of the user interface may be configured to have a respective audio modification, and the means for determining the second set of at least one user-selectable regions may be further configured to determine the second set of at least one user-selectable regions based at least in part on a detection of at least one of the audio modifications represented in the audio data.

The apparatus may further comprise means for causing a prompt to be output at the user device, and the at least one input and the at least one audio input may be received in response to the prompt, optionally wherein the prompt causes an alphanumeric keypad and an instruction to enter a passcode to be displayed on the user interface.

The apparatus may further comprise means for receiving metadata corresponding to the user device, and the determination whether there is a correspondence between the at least one input represented in the video data and the at least one audio input represented in the audio data may be based, at least in part, on the received metadata.

The metadata may comprise metadata indicative of at least one of a type of the user device, a model of the user device or one or more dimensions of the user device.

The received video data and the received audio data may be comprised within a video file.

The apparatus may further comprise means for: receiving an expected code; and determining whether there is a correspondence between the expected code and at least one of the at least one input represented in the video data or the at least one audio input represented in the audio data; and the verifying means may be further configured to provide the verification based at least in part on the determination whether there is a correspondence between the expected code and the at least one of the at least one input represented in the video data or the at least one audio input represented in the audio data.

The received audio data may comprise at least one biometric audio distortion, wherein the apparatus may further comprise means for determining whether there is a correspondence between the at least one biometric audio distortion and a predetermined biometric user profile, and the verifying means may be further configured to provide the verification based at least in part on the determination whether there is a correspondence between the at least one biometric audio distortion and the predetermined biometric user profile.

According to a second aspect, this specification describes a method comprising receiving video data representing a video recording of at least one input made by a user at a user device; receiving audio data representing an audio recording of at least one audio input made by the user at the user device; determining whether there is a correspondence between the at least one input represented in the video data and the at least one audio input represented in the audio data; and providing verification based on the determination.

The method may further comprise determining whether the at least one input represented in the video data and the at least one audio input represented in the audio data were made at a same time based on timing data in the received video data and audio data.

The method may further comprise determining, from the video data, a first set of at least one user-selectable regions of a user interface corresponding to the at least one input in the video recording; and determining, from the audio data, a second set of the at least one user-selectable regions corresponding to the at least one audio input in the audio recording; and determining whether there is a correspondence between the at least one input represented in the video data and the at least one audio input represented in the audio data may be based at least in part on whether the first set of at least one user-selectable regions and second set of at least one user-selectable regions at least partially match.

At least one of the at least one user-selectable regions of the user interface may be configured to have a respective optical modification, comprise determining the first set of at least one user-selectable regions based at least in part on a detection of the optical modification represented in the video data.

Each respective optical modification may comprise at least one of colour modification or a brightness modification.

Determining the second set of the at least one user-selectable regions may comprise determining the second set of the at least one user-selectable regions based at least in part on spatial information in the audio data.

Each of the at least one user-selectable regions of the user interface may be configured to have a respective audio modification, and determining the second set of at least one user-selectable regions may comprise determining the second set of at least one user-selectable regions based at least in part on a detection of at least one of the audio modifications represented in the audio data.

The method may further comprise causing a prompt to be output at the user device, and receiving the at least one input and the at least one audio input in response to the prompt, optionally wherein the prompt causes an alphanumeric keypad and an instruction to enter a passcode to be displayed on the user interface.

The method may further comprise receiving metadata corresponding to the user device, and determining whether there is a correspondence between the at least one input represented in the video data and the at least one audio input represented in the audio data may be based, at least in part, on the received metadata.

The metadata may comprise metadata indicative of at least one of a type of the user device, a model of the user device or one or more dimensions of the user device.

The received video data and the received audio data may be comprised within a video file.

The method may further comprise receiving an expected code; and determining whether there is a correspondence between the expected code and at least one of the at least one input represented in the video data or the at least one audio input represented in the audio data; and providing the verification may be based at least in part on the determination whether there is a correspondence between the expected code and the at least one of the at least one input represented in the video data or the at least one audio input represented in the audio data.

The received audio data may comprise at least one biometric audio distortion, and the may further comprise determining whether there is a correspondence between the at least one biometric audio distortion and a predetermined biometric user profile, and providing the verification may be based at least in part on the determination whether there is a correspondence between the at least one biometric audio distortion and the predetermined biometric user profile.

According to a third aspect, this specification describes a computer program comprising instructions for causing an apparatus to perform at least the following: receive video data representing a video recording of at least one input made by a user at a user device; receive audio data representing an audio recording of at least one audio input made by the user at the user device; determine whether there is a correspondence between the at least one input represented in the video data and the at least one audio input represented in the audio data; and provide verification based on the determination Example embodiments of the third aspect may also provide any feature of the second aspect.

According to a fourth aspect, this specification describes a computer-readable medium (such as a non-transitory computer-readable medium) comprising program instructions stored thereon for performing at least the following: receiving video data representing a video recording of at least one input made by a user at a user device; receiving audio data representing an audio recording of at least one audio input made by the user at the user device; determining whether there is a correspondence between the at least one input represented in the video data and the at least one audio input represented in the audio data; and providing verification based on the determination Example embodiments of the fourth aspect may also provide any feature of the second aspect.

According to a fifth aspect, this specification describes an apparatus comprising: at least one processor; and at least one memory including computer program code which, when executed by the at least one processor, causes the apparatus to: receive video data representing a video recording of at least one input made by a user at a user device; receive audio data representing an audio recording of at least one audio input made by the user at the user device; determine whether there is a correspondence between the at least one input represented in the video data and the at least one audio input represented in the audio data; and provide verification based on the determination.

Example embodiments of the fifth aspect may also provide any feature of the second aspect.

BRIEF DESCRIPTIONS OF DRAWINGS

Example embodiments will now be described, by way of non-limiting example, with reference to the accompanying drawings, in which:

FIG. 2 is a flow diagram indicating processing operations according to some example embodiments;

FIG. 3 is a flow diagram indicating processing operations according to some example embodiments;

DETAILED DESCRIPTION

Figure 1:
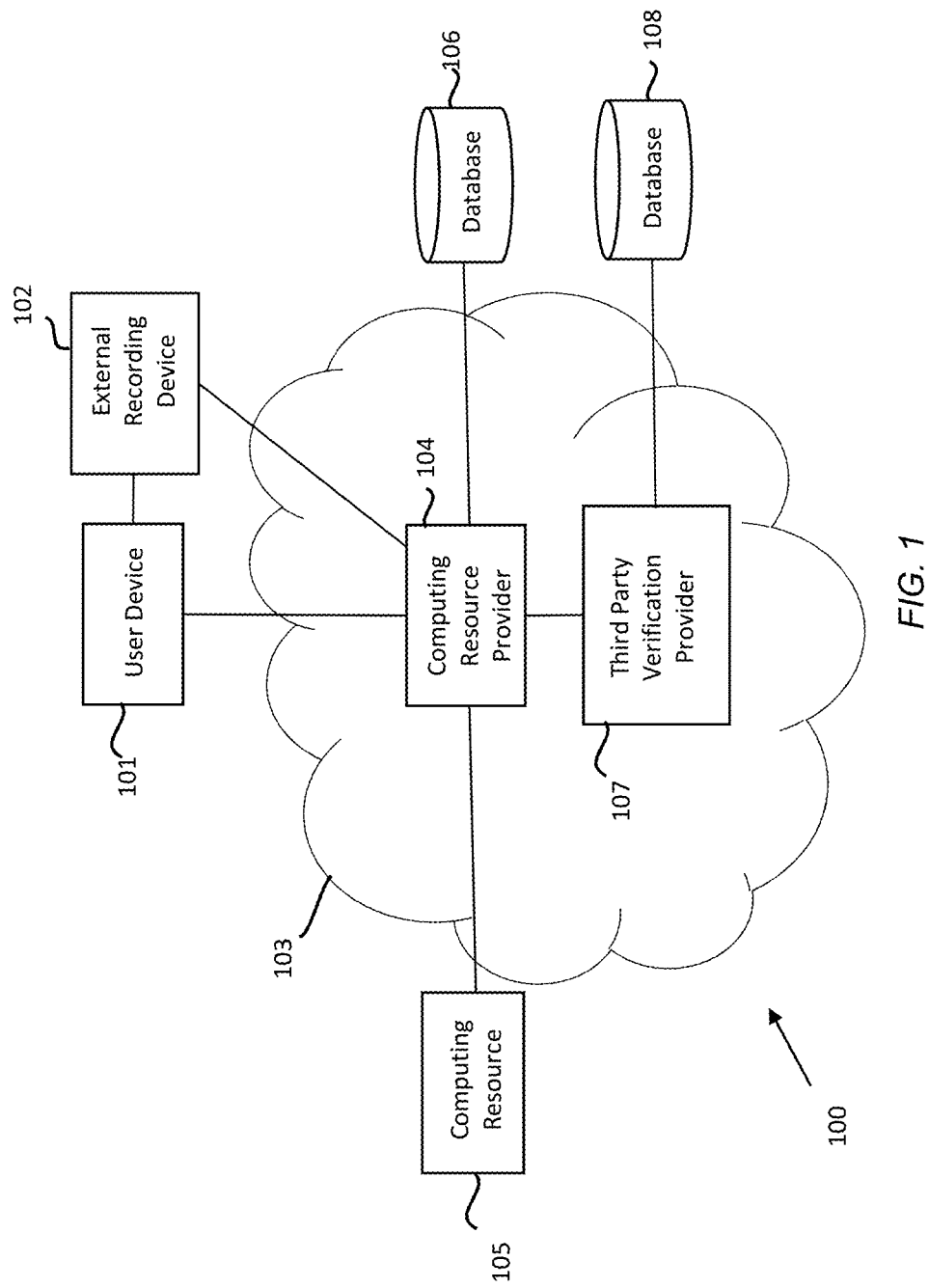
FIG. 1 is a schematic view of an example system according to some example embodiments.

Example embodiments may relate to apparatuses, methods and computer programs for providing verification, for example providing verification based on video data and audio data.

Remote verification may refer to any method for verifying a request or a transaction from a remote computing device, for example a smartphone device. Examples of remote verification include verification of a user identity, verification of location and verification of a human user via any of video data, audio data, biometric data or data from a challenge-response test (e.g. CAPTCHA).

The security of services such as banks or payment services may rely on remote verification to verify a user's identity before allowing the user to access private information or make a transaction. Automated software-based systems which authorize a request via analysis of received data allow for scalability of secure services to a large number of users.

An example method of verification is video verification. A user of a remote computing device may provide data to allow for verification via a video link. An example method of video verification includes identifying the user to be human via analysis of video data to detect certain features such as the position of facial features. The analysis of the facial features may be matched to a predetermined registered user identification profile to identify the user. Secure video verification is currently required for many secure remote resources, for example secure video verification is used for remote onboarding and enrolment, secure remote working and authorising payments.

Software capable of faking video data may recreate the features required for successful verification. The faked video content produced is often referred to as a 'deepfake'. The faking of such content can be problematic as it may provide verification of an unauthorised user. For example, a target user's face may be accurately recreated in faked video content and used to provide verification. Deepfake video content may potentially cause or contribute to a number of issues for businesses and individuals including data breaches, fraud, identity theft, losses and reputation damage.

In example embodiments, secure video verification may be facilitated by incorporating physical-layer verification into video data verification. By utilising the analysis of physical layer measurements to link physical measurements made at a user device to video verification, the presence of a real human user can be confirmed. Purely software-based video verification systems may be overcome by a relatively minor evolution of video deepfaking technology. Linking video verification with physical-layer measurements may increase security, and may make it more difficult for future generations of deepfake video generation techniques to overcome software-based deepfake detection techniques (e.g. advanced lip-movement analysis).

A user input made on a user device via a user interface of the user device may be encoded in spatial audio data. When a user interacts with a user device, for example via a touch screen user interface of a user device, an acoustic 'tap' noise may be made. This audible noise may be recorded by a microphone. The microphone may be located on the user device or on an external device in proximity. The audible tap noises of a user input may encode enough spatial information to allow the position of the user input relative to the user interface to be determined. By analysing an audio recording of the audio user input, the exact user input may be determined, for example a passcode entered on the user device. Other data may be utilised when determining the user input, for example, metadata such as a user device model, one or more dimensions of the user device, the composition of on-screen display content, spatial positions of at least one user-selectable region of the user interface, the user's grip position of the user device (which could be determined acoustically, for example using one or more microphones), and/or microphone position(s) of the user device. This may be done without guided or prompted user inputs (passively), or with guided or prompted user inputs (actively).

User input on a user device via a user interface may be encoded in video data. When a user interacts with a user device, for example via a touch screen interface, their finger may cover part of the user interface at the input location. This covering of the user interface may be recorded by a camera. The camera may be located on the user device or on an external nearby device. Additionally, the user interface may have at least one optical modification. The at least one optical modification may comprise a static or time-varying change in colour or brightness of at least a portion of the user interface. The optical modifications on the user interface may be spatially varied such that different parts of the screen, corresponding to different input options, have different optical modulations. The covering of an optical modification by a user's finger or the like may be recorded in video data. The covering of part of a user interface upon user input may encode enough information for the position of the user input relative to the user interface to be determined. By analysing the video data representing the video recording of the user input, the exact user input may be determined, for example a passcode entered on the user device. Other data may be utilised when determining the user input, for example, details of the one or more optical modifications used, associated device metadata such as a user device model, one or more dimensions of the user device, the composition of on-screen display content, spatial positions of one or more user-selectable regions of the user interface, the user's grip position of the user device and/or the camera position of the user device or external device. This may be done without guided or prompted user inputs (passively), or with guided or prompted user inputs (actively).

Example embodiments may provide communication with a user device. Video data representing a video recording of at least one input made by a user at a user device may be received from a user device via a network. Audio data representing an audio recording of at least one audio input made by the user at a user device may be received from a user device via a network. In some example embodiments, the user device, or a different device, is caused to provide a prompt for a user input. The user interface may display on screen optical modifications, as discussed elsewhere.

Verification may be provided based on analysis of received data, such as the video data and audio data. Analysis of received video and audio data may facilitate a determination of a correspondence between the video and audio data. For example, analysis of received data may facilitate a determination whether the one or more inputs represented in the received video data and the one or more audio inputs represented in the received audio data were made simultaneously, and/or a determination whether the one or more inputs represented in the received video data and the one or more audio inputs represented in the received audio data correspond to the same one or more spatial positions on a user interface. Determining simultaneity of the one or more inputs represented in the received video data and the one or more audio inputs represented in the received audio data may verify that a human user is physically interacting with the device live at the time of recording, which may verify that the video is not a fake.

In some example embodiments, additional steps may be performed to provide verification. For example, verification may be provided based on a code-matching verification, biometric verification, third party verification or authentication from a second user device.

FIG. 1 shows an example system 100 comprising a user device 101, a computing resource provider 104 and a third party verification provider 107 linked via a network 103. The computing resource provider 104 and the third party verification provider 107 may be referred to as verification providers.

In example embodiments, a user device 101 may comprise any processing device capable of providing at least one of video data and audio data to a network 103, for example, but not limited to, a smartphone, digital assistant, digital music player, personal computer, laptop, tablet computer, video doorbell, smart speaker, or a wearable device such as a smartwatch. The user device 101 may also comprise one or more memory modules for storing video data and/or audio data. The user device 101 may be capable of establishing a communication session with a third party, for example a computing resource provider 104 via a network 103, e.g. an audio or videoconference or a voice call. The user device 101 may be configured to transmit and receive data such as the video data and/or audio data using protocols for 2G, 3G, 4G, LTE, 5G or any future or past generation communication protocol. The user device 101 may comprise means for transmitting and receiving data such as the video data and/or audio data by short-range communications using, for example, Bluetooth, Zigbee or WiFi. The user device 101 may be configured to transmit and/or receive video data and/or audio data to/from the computing resource provider 104 via the network 103, for example using one of the aforementioned communication protocols. The user device 101 may comprise a user interface as discussed elsewhere, and optionally one or more control buttons. The user interface, such as a visual user interface, may be touch-sensitive, for example provided by a touch-sensitive display of the user device 101. The user device 101 may comprise one or more antennas for communicating with external devices, for example another user device. In some embodiments the user device 101 is capable of recording video data, for example using a camera, and/or is capable of recording audio data, for example using one or more microphones.

The user device 101 may be in communication with an external recording device 102. The external recording device 102 may be a device capable of recording at least one of audio data and video data. The external recording device 102 may also comprise one or more memory modules for storing video data and/or audio data. The external recording device 102 may be configured to transmit and receive data such as video and/or audio data using protocols for 2G, 3G, 4G, LTE, 5G or any future or past generation communication protocol. The external recording device 102 may comprise means for transmitting and receiving data such as the video data and/or audio data by short-range communications using, for example, Bluetooth, Zigbee or WiFi. The external recording device 102 may be configured to transmit recorded audio and/or video data to the user device 101 or to a network 103, for example at regular time intervals. The external recording device 102 may be configured to transmit and/or receive video data and/or audio data to/from the computing resource provider 104 via the network 103, for example using one of the aforementioned communication protocols. In some example embodiments, the external recording device 102 is configured to transmit and/or receive the video data and/or audio data to/from the computing resource provider 104 via the user device 101. In some example embodiments, the user device 101 is configured to transmit and/or receive video data and/or audio data to/from the computing resource provider 104 via the external recording device 102. In some example embodiments the external recording device 102 may be a user device, for example but not limited to, a smartphone, digital assistant, digital music player, personal computer, laptop, a tablet computer, video doorbell, a smart speaker, a camera such as a smart security camera, or a wearable device such as a smartwatch. In some example embodiments the external recording device 102 may be a user device similar to user device 101.

A computing resource provider 104 may provide one or more computing resources 105 to a user device 101. The computing resource provider 104 may, for example, be a provider of online banking services, payment services or data storage services. In an example embodiment, a computing resource provider 104 may receive an access request from a user device 101 for accessing the one or more computing resources 105. Computing resources 105 may be associated with personal or sensitive information. Therefore, the computing resource provider 104 may require verification by determining if it is safe to provide access to the requested computing resource 105. Verification may be provided based on one or more determinations made by a verification provider, for example the computing resource provider 104 or a third party verification provider 107.

In example embodiments, a verification provider may request data such as audio and/or video data required for verification in response to a request to access a computing resource 105 or a computing service being received from the user device 101. However in some example embodiments, the verification provider may not need to request the data and may receive the data without requesting the data from the user device 101. The verification provider such as the computing resource provider 104 or the third party verification provider 107 may receive the data such as the audio data and/or video data from the user device 101 and/or an external recording device 102 via a network 103. The received data may be stored in a database 106, 108, for example where the computing resource provider 104 is in communication with a database 106 and the third party verification provider 107 is in communication with the database 108. One or more determinations based on the received data may be made, as described herein, for example. Verification may be provided based on the one or more determinations, as described herein.

Referring to FIG. 2, a flow diagram is shown indicating processing operations that may be performed according to one or more example embodiments. The processing operations may be performed by hardware, software, firmware or a combination thereof. In some embodiments, the processing operations may be performed by a verification provider, for example the computing resource provider 104 or third party verification provider, in communication with a user device 101, via a network 103, as shown in FIG. 1. However, in some examples, one or more of the processing operations may be performed elsewhere, for example by the user device 101, external recording device 102, or a different device or system. For example, one or more of the processing operations may be performed by a distributed computing system.

A first operation 201 may comprise receiving video data representing a video recording of at least one input made by a user at a user device.

A second operation 202 may comprise receiving audio data representing an audio recording of at least one audio input made by the user at the user device.

A third operation 203 may comprise determining whether there is a correspondence between the at least one input represented in the video data and the at least one audio input represented in the audio data.

A fourth operation 204 may comprise providing verification based on the determination.

With regards to the first operation 201, the user device may be the user device 101 described in relation to FIG. 1, for example. The input may be a physical input performed by the user, such as a touch input or a gesture input, for example. In some examples the video recording (and the video data) may explicitly (or directly) show the at least one input being performed by the user. For example, the video recording may actually show the user's finger pressing one or more user-selectable regions of a user interface of the user device. However, in some examples the video recording (and the video data) may implicitly (or indirectly) show the at least one input. For example, the at least one input may be inferred from the video recording (and the video data) by analysing changes in colour or brightness in the video recording (or representations of changes in colour or brightness in the video data), without the recording actually showing the user's finger pressing one or more user-selectable regions of the user interface. The changes in colour or brightness captured in the video recording may have been caused by corresponding changes in colour or brightness provided at a screen/display of the user device, for example by changes in the colour or brightness of part of a user interface provided at the screen. The changes in colour and/or brightness may be reflected from objects in the scene captured by the camera that records the video, such as a part of the user. As an example, the changes in colour and/or brightness may have been reflected from a user interface provided at a screen/display of the user device towards the camera by the user's eyes or a different part of the user such as a finger.

With regards to the second operation 202, the audio input may be an audible audio input, for example an audio input which can be heard by a human. However in other examples the audio input may be inaudible, for example it may have at least one of an amplitude, frequency or duration that is imperceptible to a human, such as an ultrasound audio input. The audio input may be an audio touch input, in that the audio is generated from the user providing a touch input, such as the touch input previously described in relation to the video data. For example, the audio touch input may be generated by the user tapping the user interface. The audio data may be spatial audio data comprising spatial information, as described elsewhere in this disclosure. The spatial information may be indicative of a position of the audio input in space relative to one or more microphones that picked up the audio, for example microphones on a user device. The audio input may correspond to the input discussed in relation to the video data, in that they both are the result of the same action being performed by the user (e.g. a 'tap' at a user interface).

With regards to the third operation 203, in some examples it may be determined whether the at least one input represented in the video data and the at least one audio input represented in the audio data were made at a same time. As an example, it may be determined whether the at least one input represented in the video data and the at least one audio input represented in the audio data are synchronised, for example when the video data and audio data are comprised in the same video file.

In some examples, determining whether the at least one input represented in the video data and the at least one audio input represented in the audio data were made at a same time could be based on timing data in the received video data and audio data. For example, the video data may comprise data indicative of a time that the one or more inputs (such as touch or gesture inputs) were made. The time may be an absolute time such as a particular time in the day the one or more inputs were made, or it may be a relative time, for example a time that a second input was made relative to a first input. In some examples, additionally or alternatively to the video data comprising timing data, the audio data may, comprise timing data indicative of a time that the one or more audio inputs were made. The time may be an absolute time such as a particular time in the day the one or more audio inputs were made, or it may be a relative time, for example a time that a second audio input was made relative to a first audio input.

With regards to the fourth operation 204, the verification is provided based on the determination made in the third operation 203. For example, the verification is provided based on a determination in the third operation 203 that the at least one input represented in the video data and the at least one audio input represented in the audio data were made at the same time (i.e. simultaneously). The verification may comprise at least one of verification of the video data, verification of the audio data, verification of the simultaneity of the audio and video recordings, or verification of the user, for example. Providing the verification may comprise outputting an indication to another device that verification was successful, for example outputting an indication to the user device 101. Providing the verification may in some examples comprise providing access to the computing resource 105.

Referring to FIG. 3 another flow diagram is shown indicating processing operations that may be performed according to one or more example embodiments. The processing operations may be performed by hardware, software, firmware or a combination thereof. In some embodiments, the processing operations may be performed by a verification provider, for example the computing resource provider 104 or third party verification provider, in communication with a user device 101, via a network 103, as shown in FIG. 1. However, in some examples, one or more of the processing operations may be performed elsewhere, for example by the user device 101, external recording device 102, or a different device or system. For example, one or more of the processing operations may be performed by a distributed computing system.

A first operation 301 may comprise receiving video data representing a video recording of at least one input made at a user device. In some examples, the at least one input may comprise at least one physical input performed by a user such as at least one touch input or at least one gesture input. In some examples, the at least one input may be made with respect to a user interface, such as a visual user interface, the user interface comprising at least one user-selectable region selected by a user as a result of the at least one input.

A second operation 302 may comprise receiving audio data representing an audio recording of at least one audio input made by a user at a user device. The at least one audio input may be made with respect to the user interface described in relation to the first operation 301. The audio data and/or audio input may be similar to the audio data and/or audio input discussed previously in relation to FIG. 2.

A third operation 303 may comprise determining, from the video data, a first set of at least one user-selectable regions corresponding to the at least one input in the video recording. Each user-selectable region may be a region of a user interface, for example a user interface of the user device 101, that can be selected by a user, for example by a user touching the user interface at the user-selectable region. In some examples, each user-selectable region may correspond to a key, such as an alphanumeric key of an alphanumeric keypad, displayed on the user interface. Each user-selectable region in the first set of user-selectable regions may correspond to an input of the at least one inputs represented in the video data, and thereby correspond to a user-selectable region that was selected by the user, for example by tapping the user interface.

A fourth operation 304 may comprise determining, from the audio data, a second set of at least one user-selectable regions corresponding to the at least one audio input in the audio recording. Each user-selectable region in the second set of user-selectable regions may correspond to an audio input of the at least one audio inputs represented in the audio data, and thereby correspond to a user-selectable region that was selected by the user, for example by tapping the user interface.

A fifth operation 305 may comprise determining whether the at least one input represented in the video data and the at least one audio input represented in the audio data were made at a same time. This determination may be based on timing data in the received video data and audio data or another method, as discussed previously.

A sixth operation 306 may comprise determining a correspondence based on whether the first and second sets of at least one user-selectable regions at least partially match.

A seventh operation 307 may comprise providing verification based on the determination of at least one of the fifth operation 305 and the sixth operation 306.

Regarding the fifth operation 305, the determination may assess the simultaneity of the inputs recorded in the video data and audio data. In the case that a real human user is operating the user device, each audio input represented in the audio data and each input in the video data will be simultaneously captured by an audio recording and a video recording. The determination made in the fifth operation 305 may therefore indicate whether there is a real human user operating the user device live. If this is the case, verification may be provided as per the seventh operation 307. If the at least one input represented in the video data and the at least one audio input represented in the audio data were not made at the same time, for example as determined based on timing data in the received video data and audio data, then it may indicate that at least one of the video data or the audio data has been generated using faking software, or otherwise been compromised, which may in turn be indicative of attempted unauthorised access to a computing resource. If this is the case, verification may be refused in the seventh operation 307.

Regarding the sixth operation 306, the determination may assess whether the one or more inputs recorded in the video data and the one or more inputs recorded in the audio data correspond to the same inputs. In the case that a real human user is operating the user device, the same input will be captured by both an audio recording and a video recording for each input. The determination made in the sixth operation 306 may therefore indicate whether there is a real human user operating the user device live. If this is the case, verification may be provided in the seventh operation 307. If the first and second sets of at least one user-selectable regions do not at least partially match, then it may indicate that at least one of the video data or the audio data has been generated using faking software or otherwise compromised, which may in turn be indicative of attempted unauthorised access to a computing resource. If this is the case, verification may be refused in the seventh operation 307.

Regarding the seventh operation 307, verification may be provided based on a determination made in the fifth operation 305 (in which case the sixth operation 306 may be optional), a determination made in the sixth operation 306 (in which case the fifth operation 305 may be optional) or a combination of the determinations made in in the fifth operation 305 and the sixth operation 306. Providing the verification may comprise providing an indication that the verification was successful, or that the verification was unsuccessful. Verification may be provided based also on additional verification data, for example data associated with biometric data and/or data associated with an expected code or password, as described elsewhere in this disclosure.

One or more of the operations of FIG. 2 or FIG. 3 may be performed periodically to facilitate an ongoing assessment of whether verification should be provided. For example, rather than one or more of the operations of FIG. 2 or FIG. 3 being performed in response to a prompt for the user to provide an input, one or more of the operations may be performed without such a prompt, for example during normal use of the user device by the user. In some examples, the operations of FIG. 2 or FIG. 3 may initially be performed following a prompt, but may then be subsequently continue to be performed without a further prompt being provided.

Figure 4:
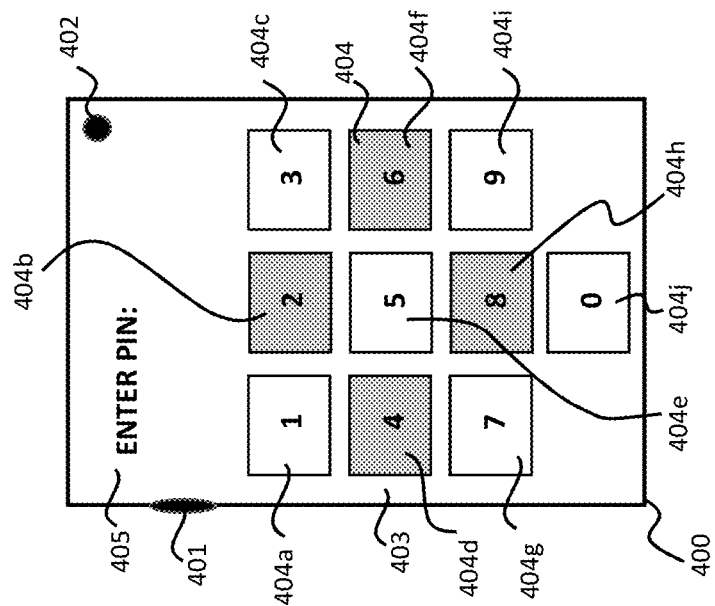
FIG. 4 is a schematic view of a user device according to some example embodiments.

FIG. 4 shows a user device 400 according to example embodiments. The user device 400 may be a user device 101 as previously described in relation to FIG. 1. In some examples, the user device 400 may be a smartphone or tablet. The user device 400 may be configured to record audio, for example to provide the audio data described herein. The audio may be recorded with at least one microphone 401 of the user device 400, for example two microphones, three microphones, or more. The use of one or more microphones 401 may allow for the capture of spatial audio data, wherein the audio data comprises spatial information that allows for a position of the origin of a sound relative to the microphones (and therefore relative to the user device 400) to be determined. The use of two or more microphones 401 may enhance the capture of spatial audio data compared to only one microphone 401, however spatial audio data could in some examples still be captured using only one microphone 401, for example where the microphone 401 is used to capture audio data representing different frequency characteristics in the sound that are dependent on the position of origin of the sound. The position of origin of the sound, for example relative to the user device 400, could be determined based on the frequency characteristics in the captured audio data. The user device 400 may be configured to record video with a camera 402, for example to provide the video data described herein.

The user device 400 may comprise a user interface 403 such as a touch sensitive visual user interface provided by a touch sensitive display or the like. The user interface 403 may comprise at least one user selectable region 404 having a respective spatial position on the user interface 403. The at least one user selectable region 404 may comprise any section or subsection of the user interface 403. Each at least one user selectable region 404 may correspond to a respective key on a keypad, such as an alphanumeric keypad. A user may therefore enter a passcode by selecting one or more keys of the keypad. FIG. 4 shows the user interface 403 comprising ten user-selectable regions 404*a-j*, each corresponding to a different one of the numbers '0' to '9'. For example, user-selectable region 404*a* corresponds to number '1', user-selectable region 404*b* corresponds to number '2', etc. However, the user interface 403 may comprise a different number of user-selectable regions 404 than this, for example any of one to nine user-selectable regions 404, or eleven or more user-selectable regions 404. While FIG. 4 shows the user-selectable regions 404 corresponding to alphanumeric keys, in other examples this may not be the case. For example, one or more of the user-selectable regions 404 may display a corresponding symbol, colour or other identifying feature, or may have no identifying feature other than the location of the user-selectable region 404 on the user interface 403.

In some example embodiments, each of the at least one user-selectable regions 404 of the user interface 403 are configured to have a respective optical modification. In other words, each of the at least one user-selectable regions 404 may have an optical property that can be used to distinguish one of the at least one user-selectable regions 404 from one or more of the other user-selectable regions 404. A user-selectable region of the at least one user-selectable regions 404 may be determined based on a detection of the optical modification.

In some examples, the optical modification may comprise at least one of a colour modification or a brightness modification. For example, a first user-selectable region (such as user-selectable region 404*a*) of the at least one user-selectable regions 404 may have a first colour such as red, while a second user-selectable region (such as user-selectable region 404*b*) of the at least one user-selectable regions 404 may have a second colour that is different to the first colour, such as blue. Where the user interface 403 is provided by a touch-sensitive display, the optical modifications may be provided by the touch-sensitive display. By way of example, if the user-selectable regions 404 comprise a plurality of keys of a keypad, each key representing one of the numbers '0' to '9', each key, or at least a substantial portion of a key, of the keypad may a have a different colour.

The optical modifications may be static, in that the modification is constant (i.e. a constant colour or brightness), or time-varying, in that the modification changes over time (i.e. a varying colour or brightness). For example, the optical modification may comprise a time-varying modification of the brightness of a user-selectable region 404, such as a predetermined variation of the brightness over time, for example a predetermined flickering pattern.

In some example embodiments, a prompt 405 may be output at the user device 400. The prompt 405 may be output by the user device 400, but may additionally or alternatively be output by a different device, such as a different device in the vicinity of the user device 400. The prompt 405 may comprise a visual prompt, for example a prompt output on the user interface 403. Additionally or alternatively, in some examples the prompt 405 may comprise an audio prompt, for example an audio instruction output using a speaker, such as a speaker of the user device 404. The prompt 405 may instruct a user to enter a certain input, for example to enter a passcode using the at least one user-selectable regions 404 of the user interface 403. Accordingly, the prompt 405 may cause an alphanumeric keypad and an instruction to enter a passcode to be displayed on the user interface 403.

Figure 5:
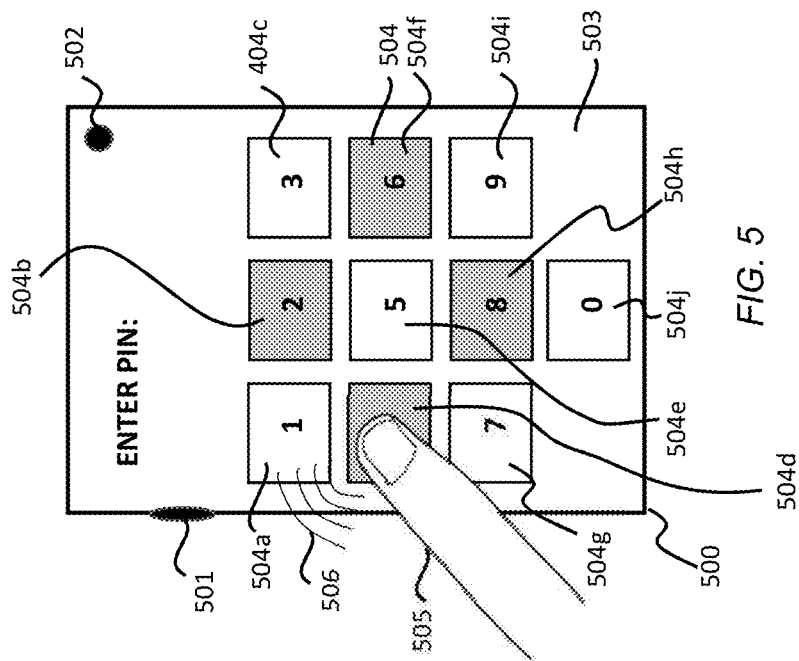
FIG. 5 is a schematic view of a touch input made by a user at a user device according to some example embodiments.

FIG. 5 shows an input being made by a user at a user device 500 according to some example embodiments. The user device 500 may be the same as the user device 400 and/or user device 101 described previously in relation to FIG. 1 and FIG. 4 respectively. The user device 500 may be configured to record audio with at least one microphone 501. The user device 500 may be configured to record video with a camera 502. The user device 500 may comprise a user interface 503 such as touch sensitive visual user interface 503, comprising at least one user selectable region 504 (for example user-selectable regions 504*a-j*) which may have respective optical modifications as described previously. A user 505 may interact with the user device 500 by way of a touch input. A user 505 may use their finger or a stylus to tap a user selectable region 504 on the touch sensitive visual user interface 503 to select that user selectable region 504. For example, FIG. 5 shows the user 505 selecting user-selectable region 504*d* by touching that region on the user interface 503. This user input may also provide a corresponding audio input which produces an audible sound 506, however in some examples the audio input may be inaudible.

The user device 500 or an external recording device such as an external recording device 102 may record video data. The video data may represent a video recording of at least one input made by the user 505 at the user device 500. As discussed previously, the video recording may not necessarily show a user's finger touching the one or more user-selectable regions 504, however the touching may be inferred from the video recording. The video data may be sent from the user device 500 or external recording device to a verification provider, such as the computing resource provider 104 or the third party verification provider 107 described previously.

In example embodiments, the video recording is recorded using the camera 502 located on the user device 500. The video recording taken by the camera 502 may record at least one input such as a touch input or a gesture input made by a user 505 at the user device 500, for example. In some example embodiments, the video recording may record the input by recording the reflections of the user interface 503 in one or more surfaces, for example the user's eyes.

In other example embodiments, the video recording is recorded with a camera located on an external recording device, such as the external recording device 102 described in relation to FIG. 1. The video recording taken by the external recording device may record at least one input such as a touch input or a gesture input made by a user 505 at the user device 500. In some example embodiments, the video recording may record an input by recording the user interface 503 directly, or by recording reflections of the user interface 503 in one or more surfaces.

In some example embodiments, a first set of at least one user-selectable regions 504 corresponding to the at least one input in the video recording is determined from the video data. The determination may be made based on the detection and/or analysis of optical modifications indicated in the video data. When a user 505 performs an input on the user interface 503, the user-selectable region 504*a-j* of the at least one user-selected regions 504 which is touched may be at least partially covered by the user's finger. In example embodiments, each of the at least one user-selectable regions 504*a-j* of the user interface 503 are configured to have a respective optical modification. The optical modification may comprise at least one of a static or time-varying modification to colour or brightness, as described previously. In some example embodiments, the first set of at least one user-selectable regions 504 is determined based, at least in part, on the detection of at least one of the optical modifications represented in the video data.

When a user-selectable region 504 with a respective optical modification is covered by a user 505 upon performing an input at the user interface 503, video data representing a video recording may capture the covering of the optically modified user-selectable region 504 selected by the user as a part of the user input. By analysis of the video data representing a video recording of the input made by a user 505 at a user device 500, the presence, absence or modification of a certain optical modification, or combination of optical modifications, may be determined. From this, details of the user input are ascertained, thereby determining that the user-selectable region 504 configured to have the covered optical modulation is the user-selectable region 504 selected by the user 505 via the user input.

The user device 500 or an external recording device may record audio data. Audio data representing an audio recording of at least one audio input made by a user at a user device 500 may be sent from the user device 500 or external recording device to a computing resource provider 103 or a third party verifier 107, or the like.

In example embodiments, the audio data is recorded with one or more microphones 501 located on the user device 500, as described previously. The audio recording taken by the microphone may record at least one audio input made by a user 505 at a user device 500.

In other example embodiments, the audio data is recorded with one or more microphones located on an external recording device, such as the external recording device 102 described in relation to FIG. 1. The audio recording taken by the external recording device may record at least one audio input made by a user 505 at a user device 500.

In some example embodiments, a second set of at least one user-selectable regions 504 corresponding to the at least one audio input represented in the audio recording is determined from the audio data.

In some example embodiments, the second set of at least one user-selectable regions 504 may be determined based on spatial information encoded in the audio data. For example, when a user 505 performs an input on the user interface 503, a user-selectable region 504 having a respective spatial position on the user interface 503 may be tapped, causing an audible noise 506 (or in some cases inaudible noise) originating at the spatial position of the user input. For example, when a user-selectable region 504 on the user interface 503 is tapped by a user 505 upon performing an input, an audio recording may capture the sound made by the user's finger on the user interface 503. The captured audio may contain encoded spatial information indicating the spatial position of the portion of the user interface 503 tapped by the user 505. Via analysis of the audio data representing an audio recording of the audio input made by a user 505 at the user device 500, the spatial position of the user input may be determined, and thereby a corresponding user selectable region 504 may be determined. In the example of FIG. 5, the audio data may contain spatial information recorded by one or more microphones 501 which can be used to determine that that the user 505 selected the user-selectable region 504*d*.

In other example embodiments, additionally or alternatively to determining the second set of at least one user-selectable regions 504 based on the spatial information, the determination may be made based on the detection and/or analysis of one or more audio modifications present in the audio data. Each of the at least one user-selectable regions 504*a-j* of the visual user interface 503 may be configured to have a respective audio modification, similar to the optical modifications described previously. For example, each user-selectable region 504*a-j* may be configured to have a different audio modification so that each user-selectable region 504 is identifiable by its respective audio modification. The audio modification may be provided by vibrating each user-selectable region 504*a-j* of the user interface 503 in a different manner. Each region of the user interface 503 corresponding to each of the user-selectable regions 504 may be vibrated in a particular manner to cause the audio modification. The audio modifications may each comprise at least one of a vibration modification, an audible tone modification or an ultrasonic tone modulation. In some example embodiments, the second set of at least one user-selectable regions 504 is determined based, at least in part, on the detection of at least one of the audio modifications represented in the audio data. For example, when a user's finger makes contact with the user device 500, the audio modification provided by the user device 500 may be distorted. Analysis of the audio data representing an audio recording of the audio input made by a user at the user device 500 may determine the presence, absence or distortion of a certain audio modification which may indicate the spatial position of the point of origin of the user audio input on the user interface 503, and thereby be used to determine a corresponding user selectable region 504*a-j* selected by the user using the input.

In some example embodiments, a verification provider may cause a prompt to be output by the user device 500, such as a user-interface prompt. The at least one input and the at least one audio input may be received by the verification provider in response to the prompt. The prompt may cause an alphanumeric keypad and an instruction to enter a passcode to be displayed on the user interface 503 of the user device 500. A prompt may instruct a user 505 to enter a particular user input, for example an expected code or input. The prompt may in some examples also indicate a time at which to enter the particular user input. The prompt may guide the user 505 with other instructions, for example, to hold the user device 500 in such a way to maximize detectability of reflected light or to interact with a device other than the user device 500.

In some example embodiments, a verification provider may receive metadata, such as video recording metadata. The metadata may be sent from the user device 500, an external recording device or another device. Such metadata may comprise metadata indicative of at least one of a type of the user device 500, a model of the user device 500, or one or more dimensions of the user device 500, such as dimensions associated with the user interface 503 or location of the microphones 501. The metadata may also comprise further information about the user-device interaction, for example, the user's grip position during video recording, determined in some examples by one or more grip sensors of the user device 500 or using one or more microphones 501, and/or the spatial positions of at least one of the user selectable regions 504*a-j* on the user interface 503.

In some example embodiments, the determination 203 whether there is a correspondence between the at least one input represented in the video data and the at least one audio input represented in the audio data is based, at least in part, on the received metadata. For example, the user device 500 or another device may send the metadata such as device model and/or dimensions to a computing resource provider 104 and/or third party verification provider 107, in some examples in addition to the audio data and/or video data. Analysis of the audio data may determine a spatial position of a user input on the user interface 503 of the user device 500, as described previously. The metadata, for example the device model and/or one or more dimensions, may then be used in conjunction with the spatial position of the user input determined from the audio data to determine the specific user-selectable region 504a-j of the user interface 503 that was selected by the user as part of the user input, for example the exact keystroke of the user input. In some example embodiments, device metadata may be stored in a database 106, 108 by the verification provider, for example the a computing resource provider 104 or the third party verification provider 107. However, in some embodiments the metadata, such as the device model, is not provided. For example, the metadata may not be transmitted by the user device 500 and/or received by the computing resource provider 104 or the like. This may be the case where sufficient information to enable the reconstruction of user device properties (e.g. spatial audio properties) already exists at the receiving side, for example at the computing resource provider 104 or third party verification provider 107.

Figure 6:
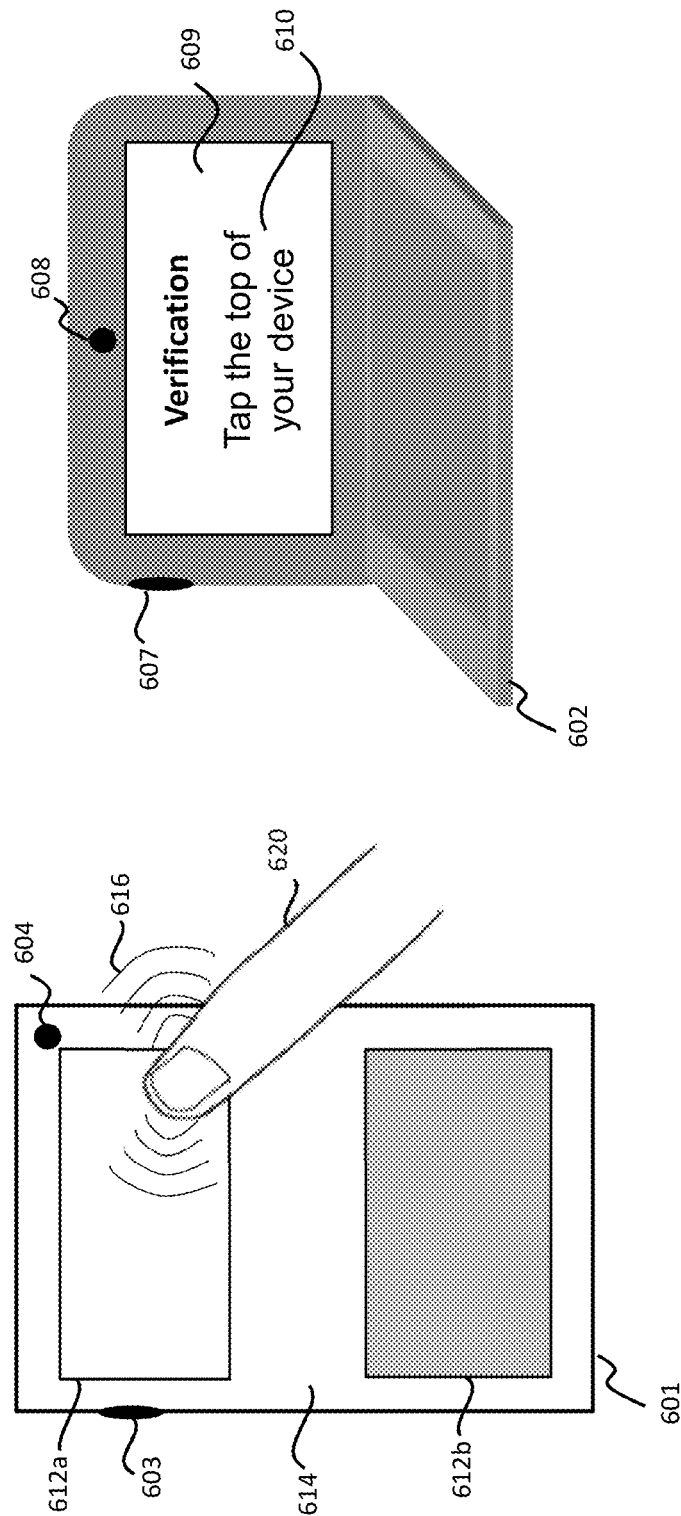
FIG. 6 is a schematic view of a first user device and a second user device according to some example embodiments.

FIG. 6 shows a first user device 601 and a second user device 602 according to some example embodiments. The first user device 601 may be a user device 101 as discussed previously. The second user device 602 may be any processing device capable of sending data via a network 103, for example, but not limited to, a smartphone, digital assistant, digital music player, personal computer, laptop, tablet computer, a video doorbell or a wearable device such as a smartwatch, as described previously. In some example embodiments a second user device 602 may be an external recording device 102 or a user device 101 as discussed previously.

In some embodiments the first user device 601 may be capable of recording video data using a first camera 604 located on the first user device 601. The second user device 602 may be capable of recording video data using a second camera 608 located on the second user device 602. In some embodiments, the first user device 601 may be capable of recording audio data using one or more first microphones 603 located on the first user device 601. The second user device 602 may be capable of recording audio data using one or more second microphones 607 located on the second user device 602.

The second user device 602 may comprise user interface 609 such as a user interface described elsewhere in this disclosure. The second user device 602 may optionally display one or more user instructions or other user interface prompts 610 sent by a computing resource or verification provider, or the like. In some example embodiments, the user interface prompt 610 displayed on the visual user interface 609 of the second user device 602 may instruct a user 620 to interact with a first user device 601. The user interface prompt 610 may direct a user 620 to enter a certain input on the first user device 601, for example, to select a first user selectable region 612a or a second user-selectable region 612b on the visual user interface 614 of the first user device 601. In other example embodiments, the user interface prompt 610 may direct a user 620 to enter a certain input such as a particular passcode. Accordingly, the user interface prompt 610 may cause an alphanumeric keypad to be displayed on the user interface 614 of the first user device 601 and an instruction to enter a passcode to be displayed on the user interface 609 of the second user device 602 and/or user interface 614 of the first user device 601. The user 620 may provide an input by selecting one or more of the user-selectable regions 612 provided on the user interface 614 of the first user device 601. Each user input may provide a corresponding sound 616, for example when the user 620 taps the user interface 614, which sound 616 can be detected as an audio input.

In some example embodiments, one of the received video data and audio data discussed previously is received from the user device 601 and the other is received from a different device, for example an external recording device such as the second user device 602. In other example embodiments the received video data and audio data is received from a single device, for example, both the video data and audio data are received from the first user device 601, or both the video data and audio data are received from the second user device 602. In some example embodiments, the user input represented in the video data may be provided at the first user device 601, however the video data may be received from a first external recording device different to the user device 601, while the audio data may be received from a second external recording device different to the user device 601 and the first external recording device. In some example embodiments the received video data and the received audio data are comprised within a video file.

In some example embodiments, a first user device 601 and a second user device 602 may record video and or audio data simultaneously. First video data representing a first video recording of at least one input made by a user 620 at a first user device 601 may be received by a computing resource provider or a verification provider. Additionally, second video data representing a second video recording of the same at least one input made by the user 620 at the first user device 601 may be received by the same computing resource provider or a verification provider. A determination of whether there is a correspondence between the at least one input represented in the first video data and the at least one audio input represented in the first audio data may be made, as discussed previously. Additionally, a determination of whether there is a correspondence between the at least one input represented in the second video data and the at least one audio input represented in the second audio data may be made. Verification may then be provided based on one of or both of these determinations, as discussed previously.

In some example embodiments, the user 505 may perform a non-touch user input, for example a gesture input. The verification provider may subsequently receive video data representing a video recording of at least one non-touch input made by a user 505 at a user device such as the user device 500 and audio data representing an audio recording of at least one non-touch input made by the user 505 at the user device, such as the user device 500. A non-touch input, for example a gesture input, may be represented in audio data using reflections of emitted audio. For example, if the user device 500 emits an audible or ultrasonic sound, the reflections of the sound from the user's hand back to an audio recording device such as microphone 501 may encode information that can be used to determine the gesture performed by the user 505. The verification provider may determine whether there is a correspondence between the at least one non-touch input represented in the video data and the at least one non-touch input represented in the audio data. For example the verification provider may determine whether the non-touch input represented in the video data substantially matches the at least one non-touch input represented in the audio data. Verification may be provided based on the determination. For example, verification may be provided based on a determination that the non-touch input represented in the video data substantially matches the at least one non-touch input represented in the audio data In some example embodiments, verification may be provided based on more than one factor. For example, verification may be provided based on both the determination of whether there is a correspondence between the at least one input represented in the video data and the at least one audio input represented in the audio data and one or more additional verification factors.

In some example embodiments, an additional verification factor may be an expected code. A verification provider may receive an expected code, for example a predetermined code that is to be input by a user 505 at a user device 500 for successful verification. The expected code may be received in response to a request sent by the verification provider. Verification may be provided based on a determination whether there is a correspondence between the received expected code and at least one of the at least one inputs represented in the video data or at least one audio inputs represented in the audio data. In some example embodiments the expected code may be a password, a PIN code, a pattern such as a swipe pattern, or a gesture. The expected code may be stored in an associated user profile in a database, such as the database 106 or database 108 described in relation to FIG. 1. In some embodiments, the expected code may be sent to a second user device 602. The second user device 602 may output an indication of the expected code so that the user can input the expected code into a first user device 601 for verification. In some embodiments where the correct replication of an expected code is used for verification, the user interface 503 output at a user device 500 may be changed each time a code is to be input by the user 505, to further increase security. For example, the positions of one or more of the user selectable regions 504 and/or positions of one or more of the optical modulations in the user interface 503 may be different each time a code is to be input by the user. In some examples, the positions may be randomised before each input is required.

In some example embodiments, an additional verification factor may be a biometric verification. User biometric information may be stored in an associated predetermined user profile in a database, accessible by the verification provider, such as the database 106 or database 108 described in relation to FIG. 1. In some example embodiments, biometric information received by the verification provider may comprise at least one biometric audio distortion comprised in the audio data. Each user 505 of a user device 500 will have unique finger bioacoustics. When a user 505 touches a user device which is emitting one or more audio modifications, the unique frequency-dependent attenuation of inputs by a user's finger anatomy causes biometric audio distortions, which may be recorded in audio data. The complexity and non-linearity of the biometric audio distortion recorded in audio data for a given audio modification makes the output extremely difficult to predict or otherwise recreate without prior registration, which improves the security of verification based on the biometric data.

In a registration phase, a predetermined biometric user profile may be created. Audio data comprising at least one biometric audio distortion may be received by a verification provider. The audio data may be stored in a database as a predetermined biometric user profile.

In some example embodiments, the audio data received by a verification provider comprises at least one biometric audio distortion. Verification may be provided based at least in part on a determination of whether there is a correspondence between the at least one biometric audio distortion and a predetermined biometric user profile. In other words, it may be determined whether the biometric audio distortion comprised in the audio data from a user 505 substantially corresponds to a biometric audio distortion that would be expected for the user based on their predetermined biometric user profile. Verification may be provided if there is a substantial correspondence between the at least one biometric audio distortion and a predetermined biometric user profile.

Example Apparatus

Figure 7:
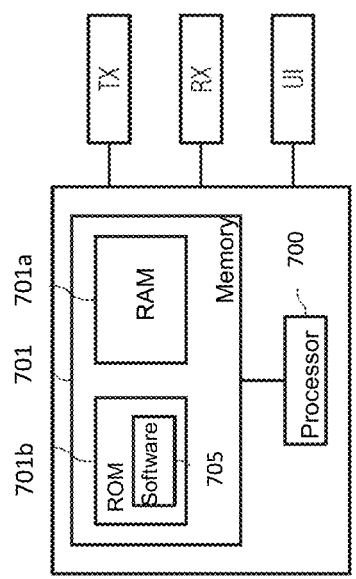
FIG. 7 is a schematic view of an apparatus in accordance with some example embodiments.

FIG. 7 shows an apparatus according to some example embodiments. The apparatus may be configured to perform any of the operations described herein, for example operations described with reference to any disclosed process. The apparatus comprises at least one processor 700 and at least one memory 701 directly or closely connected to the processor. The memory 701 includes at least one random access memory (RAM) 701*a* and at least one read-only memory (ROM) 701*b*. Computer program code (software) 705 is stored in the ROM 701*b*. The apparatus may be connected to a transmitter (TX) and a receiver (RX). The apparatus may, optionally, be connected with a user interface (UI) for instructing the apparatus and/or for outputting data. The at least one processor 700, with the at least one memory 701 and the computer program code 705 are arranged to cause the apparatus to at least perform at least the method according to any preceding process, for example as disclosed in relation to the flow diagrams of FIG. 2 and/or FIG. 3 and related features thereof.

Figure 8:
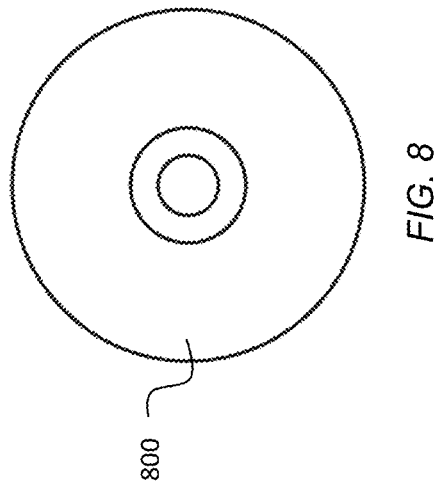
FIG. 8 shows non-transitory media in accordance with some example embodiments.

FIG. 8 shows a non-transitory media 800 according to some embodiments. The non-transitory media 800 is a computer readable storage medium. It may be e.g. a CD, a DVD, a USB stick, a blue ray disk, etc. The non-transitory media 700 stores computer program code, causing an apparatus to perform the method of any preceding process for example as disclosed in relation to the flow diagrams of FIG. 2 and/or FIG. 3 and related features thereof.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi.

A memory may be volatile or non-volatile. It may be e.g. a RAM, a SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus (104, 107) comprising:
   at least one processor; and
   at least one memory including computer program code, the at least one memory and the computer program code configured to, when executed by the at least one processor, cause the apparatus at least to:
   receive video data representing a video recording of at least one input made by a user physically interacting with a user device by a touch or gesture input;
   receive audio data representing an audio recording of at least one audio input made by the user at the user device;
   determine whether there is a correspondence between the at least one input represented in the video data and the at least one audio input represented in the audio data by determining whether the at least one input represented in the video data and the at least one audio input represented in the audio data were made at a same time based on timing data in the received video data and in the received audio data; and
   based on the determination, provide verification that the user is a human user, including outputting an indication to the user device that the verification was successful.

2. An apparatus (104, 107) comprising:
   at least one processor; and
   at least one memory including computer program code, the at least one memory and the computer program code configured to, when executed by the at least one processor, cause the apparatus at least to:
   receive video data representing a video recording of at least one input made by a user at a user device;
   receive audio data representing an audio recording of at least one audio input made by the user at the user device;
   determine whether there is a correspondence between the at least one input represented in the video data and the at least one audio input represented in the audio data;
   based on the determination, provide verification;
   based on the received video data, determine a first set of at least one user-selectable regions of a user interface corresponding to the at least one input in the video recording;
   based on the received audio data, determine a second set of the at least one user-selectable regions corresponding to the at least one audio input in the audio recording; and
   based at least in part on whether the first set of at least one user-selectable regions and second set of at least one user-selectable regions at least partially match, determine whether there is said correspondence between the at least one input represented in the video data and the at least one audio input represented in the audio data.

3. The apparatus of claim 1, wherein at least one of the at least one user-selectable regions of the user interface is configured to have a respective optical modification, and
   wherein the computer program code with the at least one processor are further configured to cause the apparatus to:
   based at least in part on a detection of the optical modification represented in the video data determine the first set of at least one user-selectable regions.

4. The apparatus of claim 3, wherein said respective optical modification comprises at least one of color modification or a brightness modification.

5. The apparatus of claim 1, wherein the computer program code with the at least one processor are further configured to cause the apparatus to: determine the second set of the at least one user-selectable regions based at least in part on spatial information in the audio data.

6. The apparatus of claim 1, wherein a respective one of the at least one user-selectable regions of the user interface is configured to have a respective audio modification, and
   wherein the computer program code with the at least one processor are further configured to cause the apparatus to: based at least in part on a detection of at least one of the audio modifications represented in the audio data, determine the second set of at least one user-selectable regions.

7. The apparatus of claim 3, wherein the computer program code with the at least one processor are further configured to cause the apparatus to: output a prompt (405) at the user device, and wherein the at least one input and the at least one audio input are received in response to the prompt,
   wherein the prompt causes an alphanumeric keypad and an instruction to enter a passcode to be displayed on the user interface.

8. The apparatus of claim 1, wherein the computer program code with the at least one processor are further configured to cause the apparatus to: receive metadata corresponding to the user device, and wherein the determination whether there is a correspondence between the at least one input represented in the video data and the at least one audio input represented in the audio data is based, at least in part, on the received metadata.

9. The apparatus of claim 8, wherein the metadata comprises metadata indicative of at least one of a type of the user device, a model of the user device or one or more dimensions of the user device.

10. The apparatus of claim 1, wherein the received video data and the received audio data are comprised within a video file.

11. The apparatus of claim 1, wherein the computer program code with the at least one processor are further configured to cause the apparatus to:
    receive an expected code;
    determine whether there is a correspondence between the expected code and at least one of the at least one input represented in the video data or the at least one audio input represented in the audio data; and
    based at least in part on the determination whether there is a correspondence between the expected code and the at least one of the at least one input represented in the video data or the at least one audio input represented in the audio data, provide said verification.

12. The apparatus of claim 1, wherein the received audio data comprises at least one biometric audio distortion, wherein the computer program code with the at least one processor are further configured to cause the apparatus to:
determine whether there is a correspondence between the at least one biometric audio distortion and a predetermined biometric user profile, and
    based at least in part on the determination whether there is a correspondence between the at least one biometric audio distortion and the predetermined biometric user profile, provide said verification.

13. The apparatus of claim 1, wherein said verification comprises at least one of a verification of an identity of the user, a location of the user or that the user is a human user.

14. A method comprising:
receiving video data representing a video recording of at least one input made by a user physically interacting with at a user device by a touch or gesture input;
receiving audio data representing an audio recording of at least one audio input made by the user at the user device;
determining whether there is a correspondence between the at least one input represented in the video data and the at least one audio input represented in the audio data by determining whether the at least one input represented in the video data and the at least one audio input represented in the audio data were made at a same time based on timing data in the received video data and in the received audio data; and
based on the determination, providing verification that the user is a human user, including outputting an indication to the user device that the verification was successful.

15. The method of claim 14, further comprising:
based on the received video data, determining a first set of at least one user-selectable regions of a user interface corresponding to the at least one input in the video recording; and
based on the received audio data, determining a second set of the at least one user-selectable regions corresponding to the at least one audio input in the audio recording; and
based at least in part on whether the first set of at least one user-selectable regions and second set of at least one user-selectable regions at least partially match, determining whether there is said correspondence between the at least one input represented in the video data and the at least one audio input represented in the audio data.

16. The method of claim 15, wherein at least one of the at least one user-selectable regions of the user interface is configured to have a respective optical modification, and wherein the method further comprises:
    based at least in part on a detection of the optical modification represented in the video data, determining the first set of at least one user-selectable regions.

17. A non-transitory computer readable medium comprising program instructions stored thereon for causing an apparatus to perform at least the following:
receiving video data representing a video recording of at least one input made by a user physically interacting with a user device by a touch or gesture input;
receiving audio data representing an audio recording of at least one audio input made by the user at the user device;
determining whether there is a correspondence between the at least one input represented in the video data and the at least one audio input represented in the audio data by determining whether the at least one input represented in the video data and the at least one audio input represented in the audio data were made at a same time based on timing data in the received video data and in the received audio data; and
based on the determination, providing verification that the user is a human user, including outputting an indication to the user device that the verification was successful.

18. The non-transitory computer readable medium of claim 17, wherein the program instructions are further configured to cause:
based on the received video data, determining a first set of at least one user-selectable regions of a user interface corresponding to the at least one input in the video recording; and
based on the received audio data, determining a second set of the at least one user-selectable regions corresponding to the at least one audio input in the audio recording; and
based at least in part on whether the first set of at least one user-selectable regions and second set of at least one user-selectable regions at least partially match, determining whether there is said correspondence between the at least one input represented in the video data and the at least one audio input represented in the audio data.

19. The non-transitory computer readable medium of claim 18, wherein at least one of the at least one user-selectable regions of the user interface is configured to have a respective optical modification, and wherein the program instructions are further configured to cause:
    based at least in part on a detection of the optical modification represented in the video data, determining the first set of at least one user-selectable regions.

\* \* \* \* \*